Dec. 14, 1948.   C. N. KELLER   2,455,935
VOLTAGE REGULATOR
Filed Aug. 17, 1944

INVENTOR.
CHARLES N. KELLER
BY William D. Hall.
ATTORNEY

Patented Dec. 14, 1948

2,455,935

UNITED STATES PATENT OFFICE 2,455,935

VOLTAGE REGULATOR

Charles N. Keller, Dayton, Ohio

Application August 17, 1944, Serial No. 549,943

2 Claims. (Cl. 322—25)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to voltage regulators and more particularly to a voltage regulator adapted to control the current output of alternators, motor generators, and the like, that are subjected in practice to variations in generator speeds, temperature changes, fluctuations in frequency, current surges, and the like.

In the operation of aeroplanes and the like, the mechanical power source together with electrical generators, alternators, and the like, that are driven by this power source, are subjected to a considerable range of variations in influencing factors. Electrical apparatus fed from these generators and that is connected and used in the operation of the mechanical parts of a plane is similarly characterized by such variations. Irregularities arising in the electrical power development have an appreciable influence upon the performance of delicate electrical instruments, such as radio sets and the like used in this field. Under these circumstances sensitive electrical instruments cannot operate to provide optimum service.

It is an object of the present invention to provide a voltage regulating device for electrical generating equipment in aeroplanes and the like that will avoid one or more of the disadvantages and limitations of the prior art.

Another object of the invention is to provide a voltage regulator for the electrical generating equipment in aeroplanes and the like, that will enable the electrical instruments used or required and energized thereby to operate effectively; that will minimize current and voltage irregularities induced in the equipment by the exigencies of operation; and absorb or compensate for the deleterious effects of fluctuations in the load, speed, frequency and temperature thereof, so the usable resultant effect will be relatively uniform and dependable.

Other objects will become apparent as the invention is more fully set forth.

For a clearer understanding of the invention and the objects thereof, reference is made to the following description, which together detail a particular form of the invention by way of example; while the scope thereof is emphasized in the claims.

Figure 1:
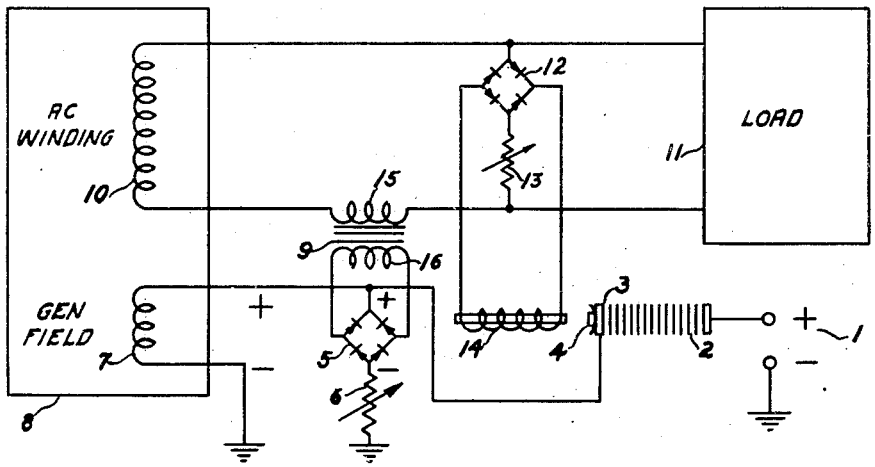
Fig. 1 is a circuit diagram of a device that embodies the present invention.

In the first form of circuit diagram shown in the accompanying drawing, the current for the generator field circuit is derived from a direct current power supply 1. A suitable variable resistance, such as a carbon pile voltage regulator 2, or the like, is in series with the positive post of the direct current source 1 and adjusts the quantity of current supplied to the circuit from that source. The carbon pile 2 terminates at its opposite end in a spring 3 that yieldingly maintains the carbon discs of the carbon pile 2 under compression, and in an armature 4. A full wave rectifier 5, in series with a variable resistor 6, is connected across a generator field 7 of an alternating current generator 8 at the direct current terminals of the rectifier 5. The excitation of the field winding 7 is of a compound nature, one normal part being supplied by the direct current source 1 and another auxiliary part being supplied by the first mentioned full wave rectifier 5, which together provide the total excitation that is impressed upon the field coil 7. The pair of alternating current posts of the full wave rectifier 5 are joined to a secondary coil 16 of a transformer 9 to provide the auxiliary excitation for the generator field circuit. The primary winding 15 of the transformer 9 is connected in series between the alternating current winding 10 of the generator 8 and one terminal of the load 11. Opposite alternating current binding posts of a second full wave rectifier 12 are shunted across the leads to the load 11 through a variable resistor 13. The pair of direct current posts of the second mentioned rectifier 12 are in series with the winding of an iron core solenoid 14. The solenoid 14 is positioned to provide magnetic attraction for the carbon pile armature 4 against the yielding resistance of the spring 3 to diminish the pressure to which the carbon discs within the carbon pile 2 are subjected, and to increase the resistance of the carbon pile 2.

In operation, direct current is fed into the generator field circuit 7 from the power source 1. The direct current passes through the carbon pile voltage regulator 2 and the generator field coil 7 of the generator 8. The flux of the field coil 7 is cut by the alternating current winding 10 of the generator 8. The secondary coil 16 of the transformer 9 feeds alternating current to the first full wave rectifier 5, which is adjusted by the adjustable resistor 6, to increase the total direct current which flows through the generator field 7. The adjustable resistor 6 serves to adjust the reflected impedance across the primary coil 15 of the transformer 9.

The second rectifier 12, which is adjusted by the variable resistor 13, supplies a desired quantity of direct current voltage to the pole magnet or iron core solenoid 14. This adjustment applies a variable pressure upon the carbon discs of the carbon pile voltage regulator 2 to introduce a variable resistance to the flow of direct current from the current source 1 to the generator field 7 of the generator 8.

The resistance of the carbon pile 2 varies directly with the strength of the current in the solenoid 14. The density of the flux about the winding 7 of the generator 8 varies correspondingly with the strength of the direct current that flows through the generator field coil 7. The strength of the alternating current that is induced in the winding 10 varies correspondingly with the density of the flux about the field winding 7 and with the speed of rotation. The quantity of direct current that the first rectifier 5 supplies to the line connecting the current source 1 with the generator field 7 varies correspondingly with the quantity of alternating current flowing through the primary winding 15 of the transformer 9.

The voltage of the alternating current that is supplied to the load 11 from the alternating current winding 10 is automatically maintained at a desired balance by this combination of means against fluctuations in the load and against fluctuations in the voltage of the direct current supply 1. This balance is further stabilized by the manual adjustment of the adjustable resistance 6 to an optimum performance setting. In this form of the device the voltage that is supplied to the generator field coil 7 is substantially the voltage of the direct current source 1.

An increase in the current demands of the load 11 increases the current flow thru the primary coil 15 of the transformer 9. This increase in current flow thru the transformer primary coil 15 induces an increase in the current flow in the transformer secondary coil 16 which is rectified by the rectifier 5 to cause an increase in the direct current flow from the rectifier 5 thru the generator field coil 7 to ground. The increase in the direct current flow thru the generator field coil 7 causes a corresponding increase in the alternate current winding 10, thereby tending to maintain constant the output voltage from the generator to the load 11 by compensating for the increased internal voltage drop that is occasioned by the increase in the current demands of the load 11.

With increase in the speed of rotation there is an increase in the internal impedance of the alternating current winding 10 due to increase in frequency that is normally accompanied by a proportionate decrease in voltage drop across the terminals of the load 11 where the load is also appreciably inductive. The impedance of the primary coil 15 is increased and more current is fed to the generator field 7. This increases the voltage in the alternating current circuit and tends to maintain constant the voltage fed to the load 11.

In so far as the rectifier action is instantaneous, this regulatory action takes place within the cycle of alternation as well as over longer periods. The device may be used to advantage to supply an abruptly changing load, as where the load includes a thyratron, rectifier or the like. A low time constant of the alternating current winding 10 improves the effectiveness of this action.

Figure 2:
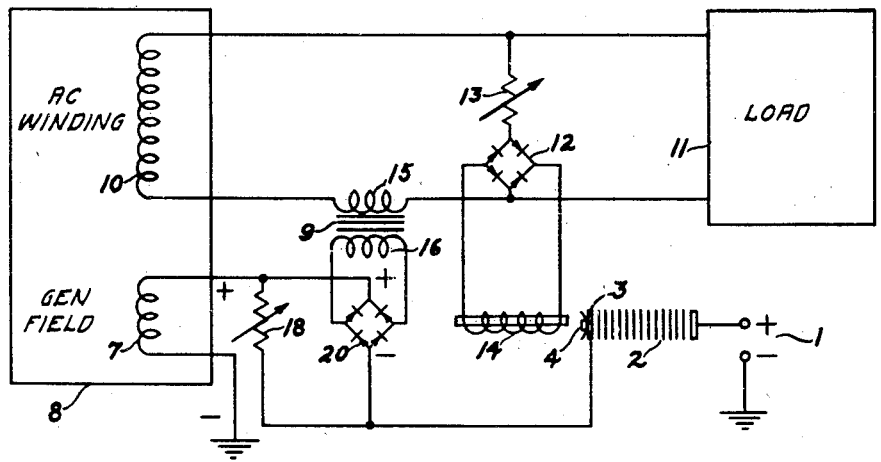
Fig. 2 is a circuit diagram that embodies modifications in the diagram shown in Fig. 1.

The modifications in circuit diagram that are shown in Fig. 2 comprise primarily the placing of the full wave rectifier 20 and the adjustable resistor 18 in parallel with each other and in series between the current source 1 and the generator field coil 7. This circuit functions in a manner that is very similar to that in which the circuit shown in Fig. 1 functions. In this form of the device the voltage across the generator field coil 7 may exceed that of the direct current source 1.

Figure 3:
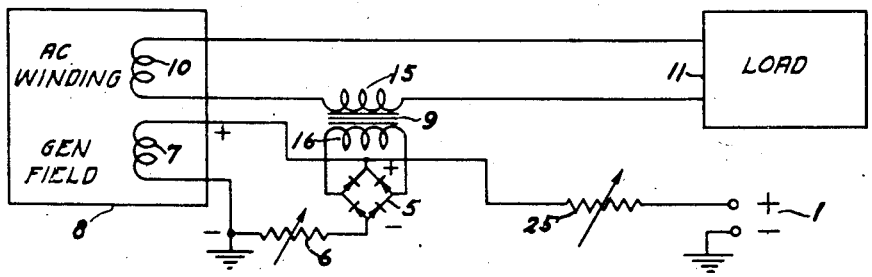
Fig. 3 is a circuit diagram that embodies further modifications in the circuit shown in Fig. 1.

The modified circuit that is shown in Fig. 3 replaces the carbon pile 2, full wave rectifier 12, adjustable resistor 13 and solenoid 14 with an adjustable resistor 25 that is manually adjusted. In other respects it operates in a manner similar to that in which the circuit that is shown in Fig. 1 operates. This circuit is adapted for satisfactory performance when the variations in direct current input are of minor magnitude, and when variations in generator speed are not excessive.

In the field of alternating current generators the voltage of an alternating current machine depends upon the synchronous armature reaction, the voltage drop being highest in machines that have a high synchronous reaction. The present invention attempts to alleviate this characteristic by providing additional excitation with lagging power factor loads. When the load 11 is increased and the impedance of the circuit is increased, there is an increase in the demagnetizing reaction of the armature on the field and the voltage that is impressed by the generator on the load drop. This increases the relative voltage regulation of the machine. It is desirable to have this voltage regulation ratio equal to unity irrespective of the load conditions and this result is an object of the present invention.

It is to be understood that the particular assembly of circuit components that have been shown and described herein have been selected for the purposes of illustrating and describing the present invention and that modifications and suitable substitutions may be made therein without departing from the present invention as defined in the appended claims.

I claim:

1. The combination of an alternating current alternator having a field winding and an alternating current winding, the alternating current winding supplying energy to an alternating current circuit supplying current to a load characterized by varying current demands, a transformer having a primary winding in series in the alternating current circuit between the alternating current winding and the load, means energized from said alternator and regulating the output voltage therefrom, a secondary winding of said transformer associated with the alternator field winding and a direct current source supplying direct current to said field winding of said alternator, a full wave rectifier drawing energy from the secondary winding of said transformer and feeding direct current to the field winding of said alternator, and an adjustable resistance in parallel with said rectifier and in series therewith between said alternator field winding and the direct current source feeding the field winding of the alternator.

2. The combination as set forth in claim 1, wherein said first-named means comprises a voltage-contollable resistance connected in series with said direct-current source and controlled by the voltage across said load.

CHARLES N. KELLER.

REFERENCES CITED

The following references are of record in the file of this patent:

UNITED STATES PATENTS

| Number | Name | Date |
|---|---|---|
| 1,357,229 | Fortescue | Nov. 2, 1920 |
| 1,710,755 | West | Apr. 30, 1929 |
| 1,943,524 | Godsey | Jan. 16, 1934 |
| 2,066,919 | West | Jan. 5, 1937 |
| 2,134,880 | McDowell | Nov. 1, 1938 |